United States Patent
Joo et al.

(10) Patent No.: US 12,203,005 B2
(45) Date of Patent: Jan. 21, 2025

(54) CONDUCTIVE MATERIAL DISPERSION

(71) Applicant: LG Energy Solution, Ltd., Seoul (KR)

(72) Inventors: Hyo Sook Joo, Daejeon (KR); Houng Sik Yoo, Daejeon (KR); Dong Hyun Kim, Daejeon (KR); Il Jae Moon, Daejeon (KR); Hyeon Choi, Daejeon (KR); Woo Ha Kim, Daejeon (KR); Sung Soo Yoon, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 18/025,783

(22) PCT Filed: May 25, 2022

(86) PCT No.: PCT/KR2022/007451
§ 371 (c)(1),
(2) Date: Mar. 10, 2023

(87) PCT Pub. No.: WO2022/250461
PCT Pub. Date: Dec. 1, 2022

(65) Prior Publication Data
US 2023/0348734 A1  Nov. 2, 2023

(30) Foreign Application Priority Data
May 28, 2021  (KR) .................. 10-2021-0069228

(51) Int. Cl.
| | |
|---|---|
| C09D 5/24 | (2006.01) |
| C09D 7/40 | (2018.01) |
| C09D 7/45 | (2018.01) |
| C09D 7/61 | (2018.01) |
| C09D 7/63 | (2018.01) |
| C09D 7/65 | (2018.01) |
| C09D 115/00 | (2006.01) |
| C09D 131/04 | (2006.01) |
| H01M 4/02 | (2006.01) |
| H01M 4/62 | (2006.01) |

(52) U.S. Cl.
CPC .............. *C09D 5/24* (2013.01); *C09D 7/45* (2018.01); *C09D 7/61* (2018.01); *C09D 7/63* (2018.01); *C09D 7/65* (2018.01); *C09D 7/70* (2018.01); *C09D 115/005* (2013.01); *C09D 131/04* (2013.01); *H01M 4/625* (2013.01); *H01M 2004/028* (2013.01)

(58) Field of Classification Search
CPC ........................................................ C09D 5/24
See application file for complete search history.

(56) References Cited

U.S. PATENT DOCUMENTS

| | | | |
|---|---|---|---|
| 8,591,771 B2 | 11/2013 | Yoon et al. | |
| 10,468,685 B2 | 11/2019 | Yoo et al. | |
| 2011/0204281 A1 | 8/2011 | Rouse | |
| 2014/0356709 A1* | 12/2014 | Arikawa | H01M 4/133 |
| | | | 252/500 |
| 2019/0044150 A1 | 2/2019 | Kim et al. | |
| 2020/0172401 A1 | 6/2020 | Kang et al. | |
| 2021/0367231 A1* | 11/2021 | Kwon | H01M 4/366 |
| 2022/0209239 A1 | 6/2022 | Kim et al. | |
| 2022/0238886 A1* | 7/2022 | Kim | H01M 4/1395 |
| 2024/0047687 A1 | 2/2024 | Kim et al. | |

FOREIGN PATENT DOCUMENTS

| | | |
|---|---|---|
| CN | 109850883 A | 6/2019 |
| JP | 2020189770 A | 11/2020 |
| KR | 20130111313 A | 10/2013 |
| KR | 101471044 B1 | 12/2014 |
| KR | 20150016852 A | 2/2015 |
| KR | 101655942 B1 | 9/2016 |
| KR | 20190091833 A | 8/2019 |
| KR | 102125963 B1 | 6/2020 |
| WO | 2020129872 A1 | 6/2020 |
| WO | 2020-235849 A1 | 11/2020 |

OTHER PUBLICATIONS

International Search Report for PCT/KR2022/007451 mailed Aug. 29, 2022. 3 pages.
Extended European Search Report including Written Opinion for Application No. 22811652.1 dated Oct. 15, 2024, pp. 1-5.

* cited by examiner

*Primary Examiner* — William D Young
(74) *Attorney, Agent, or Firm* — Lerner David LLP

(57) ABSTRACT

Provided is a conductive material dispersion comprising single-walled carbon nanotubes, a dispersant, a dispersion aid, and a dispersion medium, wherein the dispersant comprises polyvinyl butyral and hydrogenated nitrile butadiene rubber, and the dispersion aid comprises a compound represented by Formula 1.

$A\text{-}(R)_n$  [Formula 1]

In Formula 1, A is a structure having a carbon number of 16 to 50 carbon number and comprising four or more aromatic rings and nitrogen, R is a structure comprising an anionic functional group, and n is an integer of 1 to 5.

17 Claims, No Drawings

CONDUCTIVE MATERIAL DISPERSION

CROSS-REFERENCE TO RELATED APPLICATIONS

The present application is a national phase entry under 35 U.S.C. § 371 of International Application No. PCT/KR2022/007451, filed on May 25, 2022, which claims priority from Korean Patent Application No. 10-2021-0069228, filed on May 28, 2021, the disclosures of which are incorporated by reference herein.

TECHNICAL FIELD

The present disclosure relates to a conductive material dispersion including single-walled carbon nanotubes, a dispersant, a dispersion aid, and a dispersion medium, wherein the dispersant includes polyvinyl butyral and hydrogenated nitrile butadiene rubber, and the dispersion aid includes a specific compound.

BACKGROUND ART

Due to the rapid increase in the use of fossil fuels, the requirements on the use of alternative energy or clean energy are increasing, and the most actively studied field includes power generation and power storage fields using electrochemical reactions.

Recently, as the typical examples of electrochemical devices using such electrochemical energy, secondary batteries may be included, and the area of the use thereof is gradually expanding. Recently, according to the increase of the technology development and demand on portable computers, mobile phones, cameras, or the like, the demand of secondary batteries as energy sources is rapidly increasing, and among such secondary batteries, studies on lithium secondary batteries having high energy density, i.e., high capacity, have been conducted a lot, and commercialized products of them are widely used.

The positive electrode of a secondary battery includes a positive electrode active material, a conductive material, and a binder. To improve the conductivity of the positive electrode, carbon nanotubes could be used as the conductive material. If not multi-walled carbon nanotubes but single-walled carbon nanotubes are used as the carbon nanotubes, there are effects of even further reducing the resistance of an electrode. In order to uniformly distribute single-walled carbon nanotubes in a positive electrode, a conductive material dispersion in which single-walled carbon nanotubes are dispersed is formed first, and a positive electrode slurry is prepared using the conductive material dispersion during manufacturing a positive electrode.

For preparing the conductive material dispersion, a high pressure homogenizer is used. Specifically, in the high pressure homogenizer, a pre-mixed solution including bundle-type single-walled carbon nanotubes, a dispersant, and a dispersion medium, passes through a nozzle with a diameter of 150 μm by a high pressure of 1,500 bar, and by this, shear force is applied to the bundle-type single-walled carbon nanotubes to disperse the bundle-type single-walled carbon nanotubes.

Meanwhile, in the pre-mixed state of the solution including the bundle-type single-walled carbon nanotubes, the dispersant, and the dispersion medium, the bundle-type carbon nanotubes in the solution require effective de-bundling by the dispersant so that a dispersion process through the high pressure homogenizer is possible to finally prepare a conductive material dispersion in which the single-walled carbon nanotubes are uniformly dispersed. On the contrary, if the de-bundling is not smooth during the pre-mixing, phase separation between the bundle-type carbon nanotubes and the dispersion medium occurs in the solution, and the nozzle of the high pressure homogenizer may be blocked by the bundle-type carbon nanotubes, and the dispersion process through the high pressure homogenizer may be impossible. In addition, to improve the manufacturing yield of the positive electrode, it is favorable to increase the solid content of the conductive material dispersion, but the problems of impossible use of the high pressure homogenizer may become more severe with the increase of the solid content of the conductive material dispersion.

In addition, though the use of the high pressure homogenizer is available, if the viscosity of the conductive material dispersion having the same solid content is too high, the transfer of the conductive material dispersion may not be smooth, the flowability of a positive electrode slurry prepared from the conductive material dispersion may be reduced, and the manufacturing processability of a positive electrode may be degraded.

In order to solve such problems, conventionally, a method including a dispersant such as hydrogenated nitrile butadiene rubber and polyvinylidene fluoride in a conductive material dispersion has been used. However, with the use of the conventional general dispersant, the improving effects of the de-bundling was insignificant, and specifically, if the solid content of the conductive material dispersion was high, it was not very useful.

Technical Problem

A task to solve in the present disclosure is to provide a conductive material dispersion which could be applied to a dispersion process through a high pressure homogenizer and which has the low level of viscosity, among conductive material dispersions having the same solid content.

Technical Solution

According to an embodiment of the present disclosure, there is provided in the present disclosure, a conductive material dispersion comprising single-walled carbon nanotubes, a dispersant, a dispersion aid, and a dispersion medium, wherein the dispersant comprises polyvinyl butyral and hydrogenated nitrile butadiene rubber, and the dispersion aid comprises a compound represented by Formula 1.

[Formula 1]

In Formula 1, A is a structure having a carbon number of 16 to 50 and comprising four or more aromatic rings and nitrogen, R is a structure comprising an anionic functional group, and n is an integer of 1 to 5.

ADVANTAGEOUS EFFECTS

According to the present disclosure, bundle-type single-walled carbon nanotubes may be effectively de-bundled after pre-mixing during preparing a conductive material dispersion, and a conductive material dispersion may be prepared through a high pressure homogenizer, and accordingly, single-walled carbon nanotubes may be effectively dispersed in the conductive material dispersion among conductive material dispersions having the same solid content. In addition, the dispersing may be possible though the solid content of the conductive material dispersion is a high level, and an electrode manufacturing yield may be improved by the high solid content of the conductive material dispersion. Further, the viscosity of the conductive material dispersion may be a low level, and the transfer of the conductive material dispersion may become smooth, and the manufacturing processability of a positive electrode may be largely improved.

DETAILED DESCRIPTION

Hereinafter, the present disclosure will be explained in more detail to assist the understanding of the present disclosure.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the disclosure, based on the principle that an inventor may properly define the meaning of the words or terms to best explain the invention.

The terms used in the specification are used for only explaining example embodiments and do not intend to limit the present disclosure. The singular forms are intended to include the plural forms as well, unless the context clearly indicates otherwise.

It will be further understood that the terms "comprises", "comprising", "having", or the like, used in this specification, specify the presence of stated features, numerals, steps, elements, or the combination thereof, but do not preclude the presence or addition of one or more other features, numerals, steps, elements, or the combination thereof.

In the present specification, $D_{50}$ may be defined as a particle diameter corresponding to 50% of a volume accumulation amount on a diameter distribution curve of particles. The $D_{50}$ may be measured by using, for example, a laser diffraction method. By the laser diffraction method, the diameter from a submicron region to a several mm level may be generally measured, and results with high reproduction and high resolution may be obtained. An apparatus used for the measurement was Mastersizer 3000 of Malvern Co., $D_{50}$ was measured three times, and an average value was regarded as final $D_{50}$.

In the present specification, viscosity was measured using a viscometer TV-22 of TOKI Co., under conditions of 25° C. and 1 rpm.

Conductive Material Dispersion

The conductive material dispersion according to an embodiment of the present disclosure comprises single-walled carbon nanotubes, a dispersant, a dispersion aid, and a dispersion medium, wherein the dispersant comprises polyvinyl butyral and hydrogenated nitrile butadiene rubber, and the dispersion aid comprises a compound represented by Formula 1.

A-(R)$_n$ [Formula 1]

In Formula 1, A is a structure having a carbon number of 16 to 50 and comprising four or more aromatic rings and nitrogen, R is a structure comprising an anionic functional group, and n is an integer of 1 to 5. The conductive material dispersion may correspond to a conductive material dispersion used for manufacturing the electrode of a secondary battery.

The single-walled carbon nanotubes have a cylindrical fullerene series structure and mean a carbon structure having a film composed of one layer of carbon atoms as a wall and a long and hollow tube shape.

$D_{50}$ of the single-walled carbon nanotubes may be 0.4 μm to 100 μm, particularly, 1 μm to 50 μm, more particularly, 1 μm to 30 μm, for example, 1 82 m to 10 μm. The fact that $D_{50}$ of the single-walled carbon nanotubes is 1 μm to 100 μm compared to the $D_{50}$ of the bundle-type single-walled carbon nanotubes that are raw materials used for preparing a conductive material dispersion being at a level of 200 μm, means that the bundle-type carbon nanotubes are somewhat de-bundled, and the bundle-type single-walled carbon nanotubes are dispersed and present in the conductive material dispersion after applying a high pressure homogenizer. In addition, if the $D_{50}$ is reduced, the single-walled carbon nanotubes are dispersed uniformly among the conductive material dispersions having the same solid content.

The single-walled carbon nanotubes may be included in the conductive material dispersion in an amount of 0.01 wt % to 5 wt %, particularly, 0.01 wt % to 1 wt %, more particularly, 0.05 wt % to 0.8 wt %, for example, 0.1 wt % to 0.6 wt %.

The dispersant plays the role of dispersing the single-walled carbon nanotubes smoothly in the conductive material dispersion to have a preferred particle size, so that the single-walled carbon nanotubes are dispersed and present uniformly in the conductive material dispersion.

The dispersant may be included in an amount of 10 parts by weight to 2,000 parts by weight, particularly, 10 parts by weight to 1,000 parts by weight, more particularly, 30 parts by weight to 500 parts by weight based on 100 parts by weight of the single-walled carbon nanotubes. If the above-described range is satisfied, the single-walled carbon nanotubes may be smoothly dispersed, the single-walled carbon nanotubes may have a value of a small particle size, and the viscosity of the conductive material dispersion may be controlled to a suitable level.

The dispersant may include polyvinyl butyral and hydrogenated nitrile butadiene rubber.

The polyvinyl butyral may play the role of effectively de-bundling the bundle-type single-walled carbon nanotubes and controlling the viscosity of the conductive material dispersion to a suitable level.

The polyvinyl butyral may be a polymer including a vinyl butyral unit, a vinyl alcohol unit, and a vinyl acetate unit. Particularly, the polyvinyl butyral may include a unit of Formula 2-1, a unit of Formula 2-2, and a unit of Formula 2-3, and the vinyl butyral unit may correspond to the unit of Formula 2-1, the vinyl alcohol unit may correspond to the unit of Formula 2-2, and the vinyl acetate unit may correspond to the unit of Formula 2-3.

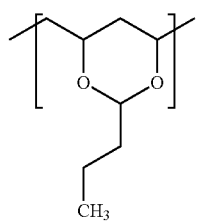

[Formula 2-1]

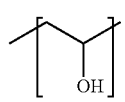

[Formula 2-2]

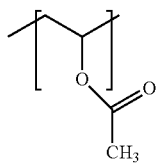

[Formula 2-3]

In the polyvinyl butyral, the vinyl alcohol unit may be included in the polyvinyl butyral in an amount of 22 wt % to 50 wt %, particularly, 23 wt % to 45 wt %, more particularly, 24 wt % to 40 wt %. If the above-described range is satisfied, the polyvinyl butyral may be easily adsorbed onto the single-walled carbon nanotubes included in the bundle-type single-walled carbon nanotubes during preparing the conductive material dispersion, and the application of a high pressure homogenizer is favorable, and a conductive material dispersion having lower viscosity than a conductive material dispersion having the same solid content may be prepared. In addition, since the polyvinyl butyral may be easily dissolved in the dispersion medium, the polyvinyl butyral may be homogeneously adsorbed onto the bundle-type single-walled carbon nanotubes. Accordingly, the de-bundling of the bundle-type single-walled carbon nanotubes may be effectively achieved.

The polyvinyl butyral may be included in the dispersant in an amount of 50 wt % to 85 wt %, particularly, 55 wt % to 80 wt %, more particularly, 65 wt % to 80 wt %. If the above-described range is satisfied, the de-bundling of the bundle-type single-walled carbon nanotubes may be effectively achieved, and the viscosity of the conductive material dispersion thus prepared may be a low level.

The weight average molecular weight of the polyvinyl butyral may be 10,000 g/mol to 150,000 g/mol, particularly, 10,000 g/mol to 50,000 g/mol, more particularly, 10,000 g/mol to 30,000 g/mol, for example, 15,000 g/mol to 30,000 g/mol. If the above-described range is satisfied, the polyvinyl butyral may be easily dissolved in the dispersion medium, the de-bundling of the bundle-type carbon nanotubes may be easy, the preparation of the conductive material dispersion through a high pressure homogenizer may be more favorable, and the viscosity of the conductive material dispersion thus prepared may be a low level.

The hydrogenated nitrile butadiene rubber plays the role of reducing the viscosity of the conductive material dispersion, and may be relatively easily dissolved in the dispersion medium to disperse the carbon nanotubes in the conductive material dispersion uniformly.

The acrylonitrile unit may be included in the hydrogenated nitrile butadiene rubber in an amount of 5 wt % to 50 wt %, particularly, 10 wt % to 50 wt %, more particularly, 20 wt % to 45 wt %. If the above-described range is satisfied, the single-walled carbon nanotubes may favorably be dispersed in the conductive material dispersion, and the viscosity of the conductive material dispersion thus prepared may be a low level.

The hydrogenated nitrile butadiene rubber may be included in the dispersant in an amount of 15 wt % to 50 wt %, particularly, 20 wt % to 45 wt %, more particularly, 20 wt % to 35 wt %. If the above-described range is satisfied, the particle size of the single-walled carbon nanotubes may be controlled to a low level, and compatibility with the dispersion medium may be excellent to reduce the viscosity of the conductive material dispersion.

The weight average molecular weight of the hydrogenated nitrile butadiene rubber may be 10,000 g/mol to 700,000 g/mol, particularly, 50,000 g/mol to 600,000 g/mol, more particularly, 200,000 g/mol to 500,000 g/mol. If the above-described range is satisfied, the viscosity of the conductive material dispersion may be reduced, the hydrogenated nitrile butadiene rubber may be easily dissolved in the dispersion medium, and the bundle-type single-walled carbon nanotubes may be effectively dispersed to disperse the single-walled carbon nanotubes in the conductive material dispersion uniformly.

The weight ratio of the polyvinyl butyral to the hydrogenated nitrile butadiene rubber may be 5:5 to 9.8:0.2, particularly, 5.5:4.5 to 9.5:0.5, more particularly, 6:4 to 9:1. If the above-described range is satisfied, the single-walled carbon nanotubes may be dispersed in the conductive material dispersion more uniformly, and the viscosity of the conductive material dispersion may be an even lower level. Accordingly, the resistance of a battery manufactured may be reduced, and processability may be improved.

The dispersion aid is disposed on the surface of the single-walled carbon nanotubes in the bundle-type single-walled carbon nanotubes during preparing the conductive material dispersion to help the adsorption of the polyvinyl butyral and the hydrogenated nitrile butadiene rubber onto the single-walled carbon nanotubes. Accordingly, it is meaningful that the dispersion aid creates a smooth environment for dispersing the single-walled carbon nanotubes by the polyvinyl butyral and the hydrogenated nitrile butadiene rubber.

The dispersion aid may include a compound represented by Formula 1.

$$A\text{-}(R)_n \qquad \text{[Formula 1]}$$

In Formula 1, A is a structure having a carbon number of 16 to 50 and including four or more aromatic rings and nitrogen, R is a structure including an anionic functional group, and n is an integer of 1 to 5.

In Formula 1, since A includes four or more aromatic rings, the dispersion aid may favorably be positioned on the bundle-type carbon nanotubes by the π-π bonds between the dispersion aid and the bundle-type carbon nanotubes. In addition, since A includes nitrogen, the compatibility between the dispersion aid and the dispersion medium may be excellent, and the hydrogenated nitrile butadiene may be easily attached onto the bundle-type carbon nanotubes.

The aromatic ring may be a benzene ring. Otherwise, the aromatic rings may get close to each other to form a polycyclic ring. Particularly, A may include a pyrene group, a chrysene group, a perylene group, or a phthalocyanine group. The phthalocyanine group may include or exclude a metal. The metal may be at least one selected from the group consisting of copper, aluminum, and zinc.

Meanwhile, the polyvinyl butyral and the hydrogenated nitrile butadiene rubber may be effectively adsorbed onto the bundle-type carbon nanotubes by R that is a structure including an anionic functional group. Accordingly, during preparing the conductive material dispersion, the bundle-type single-walled carbon nanotubes may be effectively de-bundled after pre-mixing, and the conductive material dispersion may be prepared through a high pressure homogenizer. Accordingly, when comparing conductive material dispersions having the same solid content, the single-walled carbon nanotubes in the conductive material dispersion may effectively be dispersed. In addition, these effects may be achieved even though the solid content of the conductive material dispersion is a high level, and the manufacturing yield of an electrode may be improved by the high solid content of the conductive material dispersion. Further, the viscosity of the conductive material dispersion may be a low level, the transfer of the conductive material dispersion may be smooth, and the manufacturing processability of a positive electrode may be largely improved.

R may be a structure including an anionic functional group, and the anionic functional group may particularly be at least one selected from the group consisting of —$SO_3^-$, —$COO^-$, and —$PO_4^-$. If n is an integer of 2 or more, multiple R may be the same or different from each other.

n may be an integer of 1 to 5, and may particularly be an integer of 1 to 3.

Particularly, the compound of Formula 1 may be at least one selected from the group consisting of a compound of Formula 1-1 and a compound of Formula 1-2.

[Formula 1-1]

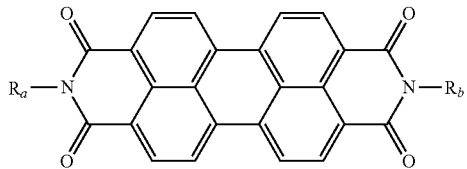

In Formula 1-1, $R_a$ and $R_b$ may be each independently a structure including an anionic functional group. Particularly, the anionic functional group may include at least any one functional group structure selected from the group consisting of —$SO_3^-$, —$COO^-$, and —$PO_4^-$ in the functional group. If the dispersion aid satisfies the structure of Formula 1-1, the benzene structure connected from each other is similar to the surface of the single-walled carbon nanotubes, and they may be adsorbed to each other well, and accordingly, the conductive material dispersion may show an even lower level of viscosity.

[Formula 1-2]

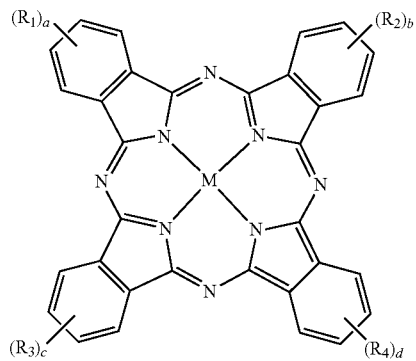

In Formula 1-2,

M may be at least one selected from the group consisting of copper, aluminum, and zinc.

$R_1$, $R_2$, $R_3$, and $R_4$ may be each independently an anionic functional group, particularly, —$SO_3^-$.

a, b, c, and d may be each independently integers of 0 to 4, and at least one among a, b, c, and d may be an integer of 1 to 4.

If the dispersion aid satisfies the structure of Formula 1-2, the viscosity of the conductive material dispersion may be an even lower level due to the effective adsorption of the phthalocyanine structure and the single-walled carbon nanotubes.

The compound of Formula 1-1 may include at least one of a compound of Formula 1-1A and a compound of Formula 1-1B.

[Formula 1-1A]

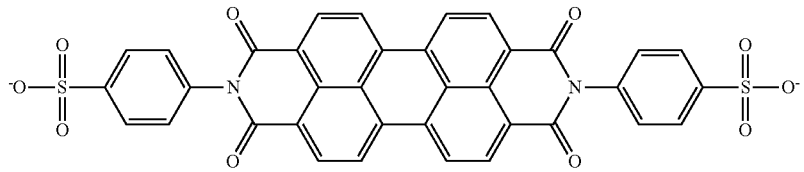

[Formula 1-1B]

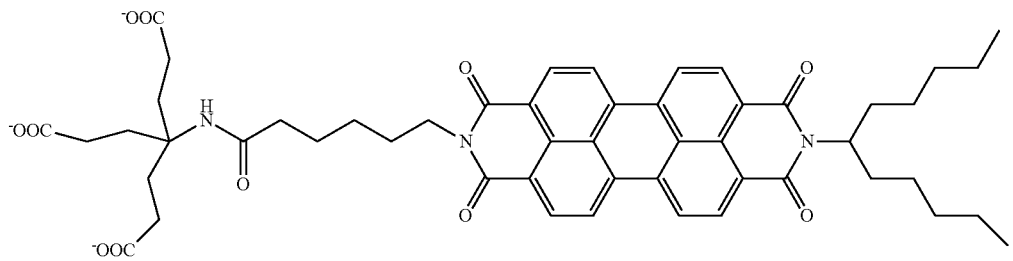

The compound of Formula 1-2 may particularly include at least one of a compound of Formula 1-2A and a compound of Formula 1-2B.

[Formula 1-2A]

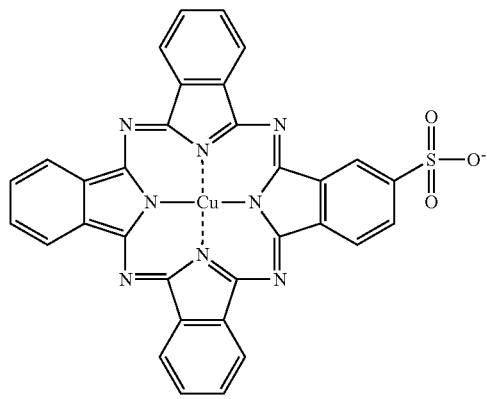

[Formula 1-2B]

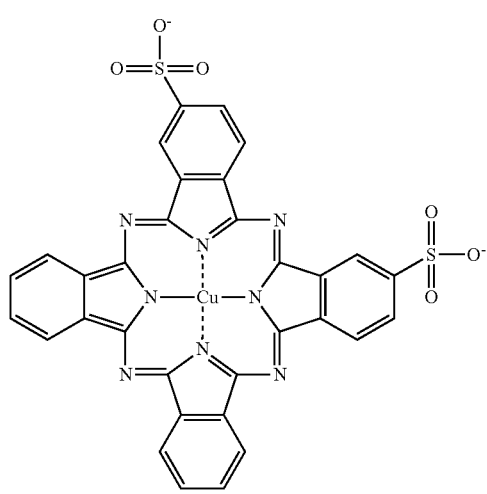

The dispersion aid may be included in an amount of 1 part by weight to 50 parts by weight, particularly, 5 parts by weight to 35 parts by weight, more particularly, 5 parts by weight to 30 parts by weight, based on 100 parts by weight of the single-walled carbon nanotubes. If the above-described range is satisfied, the polyvinyl butyral and the hydrogenated nitrile butadiene rubber may be easily attached to the single-walled carbon nanotubes, even with a suitable amount of the dispersion aid, and the single-walled carbon nanotubes may be effectively dispersed, and the control of the particle size of the single-walled carbon nanotubes and the viscosity of the conductive material dispersion may be easy.

The weight ratio of the dispersant to the dispersion aid may be 1:0.03 to 1:0.18, particularly, 1:0.045 to 1:0.150. If the above-described range is satisfied, the particle size of the single-walled carbon nanotubes may be a low level, and the viscosity of the conductive agent dispersion may be low. At the same time, the dispersant may be adsorbed on the surface of the single-walled carbon nanotubes well, and the performance of a high pressure homogenizer process may be smooth. Particularly, if the weight ratio is 1:0.045 to 1:0.150, the viscosity of the conductive material dispersion may become an even lower level.

The dispersion medium may be N-methyl-2-pyrrolidone (NMP).

The solid content of the conductive material dispersion may be 0.01 wt % to 5 wt %, particularly, 0.05 wt % to 4 wt %, more particularly, 0.1 wt % to 3 wt %. Generally, in order to derive the solid content range, there are problems of the excessive increase of the viscosity of the conductive material dispersion. In the present disclosure, though the single-walled carbon nanotubes are used, the viscosity of the conductive material dispersion may be controlled to a low level by using the dispersant of the present disclosure, and there are no problems in the preparation and use of the conductive material dispersion having the solid content.

The viscosity of the conductive material dispersion without phase separation may be 50 Pa·s or less, particularly, 0.1 Pa·s to 40 Pa·s. Since the viscosity range is satisfied, the transfer of the conductive material dispersion may be smooth, and the manufacturing processability of a positive electrode may be largely improved.

Hereinafter, preferred embodiments will be suggested to assist the understanding of the present disclosure. However, the embodiments are only for illustrating the present disclosure, and various changes and modifications may be possible within the scope and technical range of the present description. Such changes and modifications are of course possible within the claims attached herewith.

EXAMPLES AND COMPARATIVE EXAMPLES

Bundle-type carbon nanotubes, a dispersant, and a dispersion aid were prepared as follows.

① Bundle-type single-walled carbon nanotubes having a specific surface area of 1,160 $m_2/g$
② Polyvinyl butyral (A-1 to A-3)

TABLE 1

| | Manufacturing company | Product name | Vinyl alcohol unit content (wt %) | Weight average molecular weight (g/mol) |
|---|---|---|---|---|
| A-1 | Kuraray | B60T | 24 | 55,000 |
| A-2 | Sekisui | BH-3 | 34 | 55,000 |
| A-3 | Sekisui | BL-1 | 35 | 19,000 |

③ Hydrogenated nitrile butadiene rubber having a weight average molecular weight of 30,000 g/mol and including 34 wt % of an acrylonitrile unit.
④ A dispersion aid (B-1 to B-5)

TABLE 2
B-1
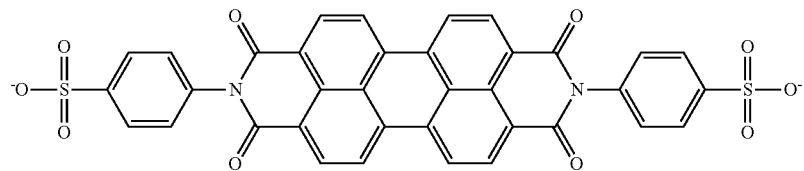
B-2
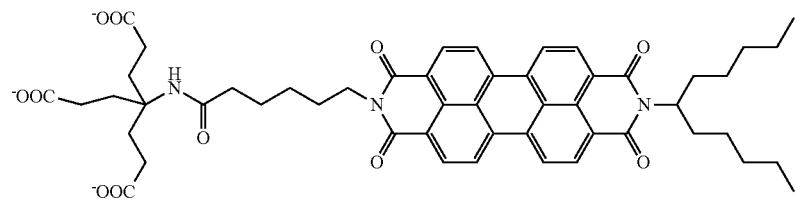
B-3
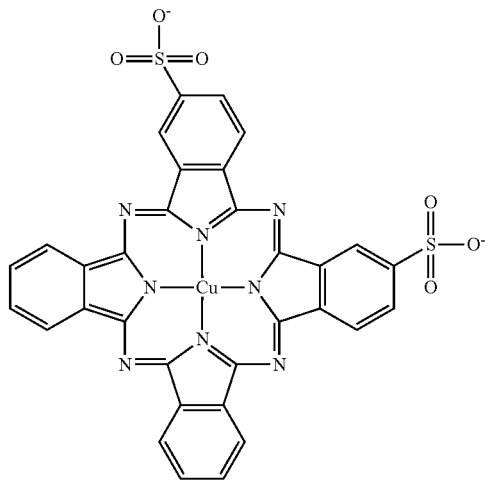
B-4
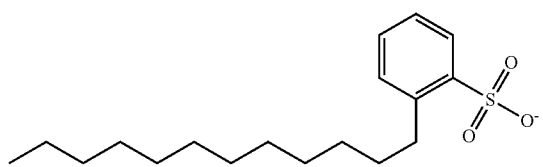 [SMILES: CCCCCCCCCCCCc1ccccc1S(=O)(=O)[O-]]

TABLE 2-continued

B-5

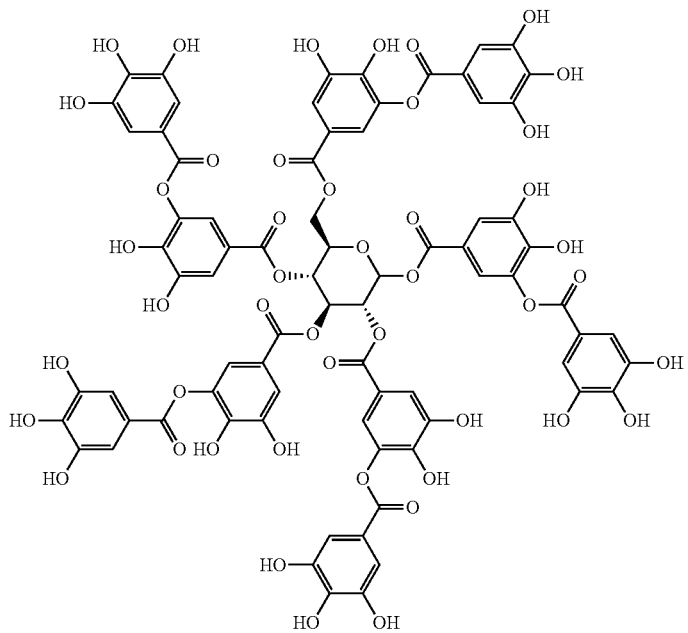 [SMILES: O=C(OC[C@H]1OC(OC(=O)c2cc(O)c(O)c(OC(=O)c3cc(O)c(O)c(O)c3)c2)[C@H](OC(=O)c2cc(O)c(O)c(OC(=O)c3cc(O)c(O)c(O)c3)c2)[C@@H](OC(=O)c2cc(O)c(O)c(OC(=O)c3cc(O)c(O)c(O)c3)c2)[C@@H]1OC(=O)c1cc(O)c(O)c(OC(=O)c2cc(O)c(O)c(O)c2)c1)c1cc(O)c(O)c(OC(=O)c2cc(O)c(O)c(O)c2)c1]

Examples 1 to 8 and Comparative Examples 1 to 8

Preparation of Conductive Material Dispersion (1) Pre-Mixing

According to Table 3 below, bundle-type single-walled carbon nanotubes, a dispersant, and a dispersion aid were injected into N-methyl-2-pyrrolidone (NMP), and 1 kg of the solution was mixed for 30 minutes using a mechanical mixer under conditions of 2,000 rpm.

(2) Dispersion Process

After that, a dispersion process was performed six times using a PICOMAX apparatus (high pressure homogenizer) of Micronox Co., under pressure conditions of 1,500 bar. However, in Comparative Examples 4 to 6, phase separation occurred in the solution after the pre-mixing, and the blocking phenomenon of the nozzle of the high pressure homogenizer occurred by the bundle-type single-walled carbon nanotubes. Accordingly, the process of the high pressure homogenizer was impossible.

TABLE 3

| | Bundle-type single-walled carbon nanotubes content (wt %) | Dispersant | | | Dispersion aid | | |
|---|---|---|---|---|---|---|---|
| | | Polyvinyl butyral type | Polyvinyl butyral content (wt %) | Hydrogenated nitrile butadiene rubber content (wt %) | Dispersion aid type | Dispersion aid content (wt %) | Dispersant:dispersion aid (weight ratio) |
| Example 1 | 0.4 | A-1 | 0.84 | 0.24 | B-3 | 0.12 | 1:0.111 |
| Example 2 | 0.4 | A-1 | 0.84 | 0.24 | B-1 | 0.12 | 1:0.111 |
| Example 3 | 0.4 | A-1 | 0.84 | 0.24 | B-2 | 0.12 | 1:0.111 |
| Example 4 | 0.4 | A-3 | 0.84 | 0.24 | B-3 | 0.12 | 1:0.111 |
| Example 5 | 0.4 | A-2 | 0.84 | 0.24 | B-3 | 0.12 | 1:0.111 |
| Example 6 | 0.4 | A-1 | 0.54 | 0.54 | B-3 | 0.12 | 1:0.111 |
| Example 7 | 0.4 | A-1 | 0.24 | 0.84 | B-3 | 0.12 | 1:0.111 |
| Example 8 | 0.8 | A-3 | 1.68 | 0.48 | B-3 | 0.24 | 1:0.111 |
| Comparative Example 1 | 0.4 | A-1 | 0.84 | 0.24 | — | 0 | — |
| Comparative Example 2 | 0.4 | — | 0 | 1.08 | B-3 | 0.12 | 1:0.111 |
| Comparative Example 3 | 0.4 | A-1 | 1.08 | 0 | B-3 | 0.12 | 1:0.111 |
| Comparative Example 4 | 0.4 | A-1 | 1.2 | 0 | — | 0 | — |
| Comparative Example 5 | 0.4 | — | 0 | 1.2 | — | 0 | — |
| Comparative Example 6 | 0.4 | — | 0 | 0 | B-3 | 1.2 | — |

TABLE 3-continued

|  | Bundle-type single-walled carbon nanotubes content (wt %) | Polyvinyl butyral type | Dispersant Polyvinyl butyral content (wt %) | Hydrogenated nitrile butadiene rubber content (wt %) | Dispersion aid type | Dispersion aid Dispersion aid content (wt %) | Dispersant:dispersion aid (weight ratio) |
|---|---|---|---|---|---|---|---|
| Comparative Example 7 | 0.4 | A-1 | 0.84 | 0.24 | B-4 | 0.12 | 1:0.111 |
| Comparative Example 8 | 0.4 | A-1 | 0.84 | 0.24 | B-5 | 0.12 | 1:0.111 |

The contents of the bundle-type carbon nanotubes, polyvinyl butyral, hydrogenated nitrile butadiene rubber, and dispersion aid were all based on the total weight of the conductive material dispersion, and the sum thereof corresponds to the solid content.

Examples 9 to 14 and Comparative Examples 9 and 10

Preparation of Conductive Material Dispersion (1) Pre-Mixing

According to Table 4 below, bundle-type single-walled carbon nanotubes, a dispersant, and a dispersion aid were injected to N-methyl-2-pyrrolidone (NMP), and 1 kg of the solution was mixed for 30 minutes using a mechanical mixer under conditions of 2,000 rpm.

(2) Dispersion Process

After that, a dispersion process was performed six times using a PICOMAX apparatus (high pressure homogenizer) of Micronox Co., under pressure conditions of 1,500 bar.

sured three times using a particle size analyzer (Mastersizer 3000 of Malvern Co.), an average value was obtained, and the results are shown in Table 5 and Table 6.

When preparing conductive material dispersions using the same bundle-type single-walled carbon nanotubes, the low value of $D_{50}$ of the single-walled carbon nanotubes in the conductive material dispersion prepared, means that the bundle-type single-walled carbon nanotubes are easily de-bundled and dispersed in the conductive material dispersion uniformly.

Referring to Table 5, in the cases of preparing conductive material dispersions using the same amount of the bundle-type carbon nanotubes, the $D_{50}$ of Examples 1 to 7 was found smaller than the $D_{50}$ of Comparative Examples 1 to 3, 7 and 8, and accordingly, the bundle-type single-walled carbon nanotubes were dispersed effectively.

Also, referring to Table 6, in the cases of preparing conductive material dispersions using the same amount of the bundle-type carbon nanotubes, the $D_{50}$ of Examples 9 to 14 was found smaller than the $D_{50}$ of Comparative Examples

TABLE 4

|  | Bundle-type single-walled carbon nanotubes content (wt %) | Polyvinyl butyral type | Dispersant Polyvinyl butyral content (wt %) | Hydrogenated nitrile butadiene rubber content (wt %) | Dispersion aid type | Dispersion aid Dispersion aid content (wt %) | Dispersant:dispersion aid (weight ratio) |
|---|---|---|---|---|---|---|---|
| Example 9 | 0.6 | A-4 | 0.855 | 0.855 | B-3 | 0.09 | 1:0.053 |
| Example 10 | 0.6 | A-4 | 1.332 | 0.378 | B-3 | 0.09 | 1:0.053 |
| Example 11 | 0.6 | A-4 | 1.260 | 0.360 | B-3 | 0.18 | 1:0.111 |
| Example 12 | 0.6 | A-4 | 0.378 | 1.332 | B-3 | 0.09 | 1:0.053 |
| Example 13 | 0.6 | A-4 | 0.357 | 0.153 | B-3 | 0.09 | 1:0.176 |
| Example 14 | 0.6 | A-4 | 1.617 | 0.693 | B-3 | 0.09 | 1:0.039 |
| Comparative Example 9 | 0.6 | — | 0 | 1.71 | B-3 | 0.09 | 1:0.053 |
| Comparative Example 10 | 0.6 | — | 0 | 1.8 | — | 0 | — |

The contents of the bundle-type carbon nanotubes, polyvinyl butyral, hydrogenated nitrile butadiene rubber, and dispersion aid were based on the total weight of the conductive material dispersion, and the sum thereof corresponds to the solid content.

Experimental Example 1: Evaluation of Particle Size of Single-Walled Carbon Nanotubes With respect to the conductive material dispersions of the Examples and the Comparative Examples, $D_{50}$ was mea- 9 and 10, and accordingly, the bundle-type single-walled carbon nanotubes were dispersed effectively.

Experimental Example 2: Evaluation of Viscosity of Conductive Material Dispersion With respect to the conductive material dispersions of the Examples and the Comparative Examples, viscosity was measured using a viscometer TV-22 of TOKI Co. under conditions of 25° C. and 1 rpm, and the results are shown in Tables 5 and 6.

When comparing the conductive material dispersions having the same solid content, it was confirmed that the viscosity of the conductive material dispersions of Examples 1 to 7 was lower than the viscosity of the conductive material dispersions of Comparative Examples 1 to 3, 7, and 8. That is, it could be found that the conductive material dispersion according to the present disclosure could have a low viscosity even though having the high solid content.

Also, referring to Table 6, it could be confirmed that the cases of Examples 9 to 12, satisfying the weight ratio of the dispersant and the dispersion aid of 1:0.045 to 1:0.150, had low viscosity of the conductive material dispersions when compared to Examples 13 and 14, which deviated from the weight ratio.

TABLE 5

|  | $D_{50}$ of single-walled carbon nanotubes (μm) | Viscosity of conductive material dispersion (Pa · s) |
| --- | --- | --- |
| Example 1 | 4.7 | 7.0 |
| Example 2 | 5.1 | 7.2 |
| Example 3 | 5.5 | 8.0 |
| Example 4 | 6.4 | 4.7 |
| Example 5 | 1.4 | 7.4 |
| Example 6 | 1.9 | 6.2 |
| Example 7 | 4.9 | 7.2 |
| Example 8 | 9.5 | 31.8 |
| Comparative Example 1 | 9.8 | 11.4 |
| Comparative Example 2 | 15.9 | 14.5 |
| Comparative Example 3 | 9.2 | 11.6 |
| Comparative Example 4 | High pressure homogenizer process impossible | |
| Comparative Example 5 | High pressure homogenizer process impossible | |
| Comparative Example 6 | High pressure homogenizer process impossible | |
| Comparative Example 7 | 10.1 | 10.5 |
| Comparative Example 8 | 12.2 | 11.7 |

TABLE 6

|  | $D_{50}$ of single-walled carbon nanotubes (μm) | Viscosity of conductive material dispersion (Pa · s) |
| --- | --- | --- |
| Example 9 | 0.52 | 11.9 |
| Example 10 | 1.3 | 8.75 |
| Example 11 | 3.3 | 8.09 |
| Example 12 | 0.79 | 9.75 |
| Example 13 | 7.6 | 14.05 |
| Example 14 | 0.57 | 13.30 |
| Comparative Example 9 | 104 | 22.9 |
| Comparative Example 10 | 29 | 28.0 |

The invention claimed is:

1. A conductive material dispersion comprising single-walled carbon nanotubes, a dispersant, a dispersion aid, and a dispersion medium,
wherein the dispersant comprises polyvinyl butyral and hydrogenated nitrile butadiene rubber, and
wherein the dispersion aid comprises a compound represented by the following Formula 1:

$$A\text{-}(R)_n \quad \text{[Formula 1]}$$

wherein in Formula 1, A is a structure having a carbon number of 16 to 50 and comprising four or more aromatic rings and nitrogen, R is a structure comprising an anionic functional group, and n is an integer of 1 to 5.

2. The conductive material dispersion according to claim 1, wherein a vinyl alcohol unit is comprised in an amount of 22 wt % to 50 wt % in the polyvinyl butyral.

3. The conductive material dispersion according to claim 1, wherein the single-walled carbon nanotubes are comprised in an amount of 0.01 wt % to 5 wt % in the conductive material dispersion.

4. The conductive material dispersion according to claim 1, wherein the dispersant is comprised in an amount of 10 parts by weight to 2,000 parts by weight based on 100 parts by weight of the single-walled carbon nanotubes.

5. The conductive material dispersion according to claim 1, wherein a weight average molecular weight of the polyvinyl butyral is 10,000 g/mol to 150,000 g/mol.

6. The conductive material dispersion according to claim 1, wherein the polyvinyl butyral is comprised in the dispersant in an amount of 50 wt % to 85 wt %.

7. The conductive material dispersion according to claim 1, wherein a weight average molecular weight of the hydrogenated nitrile butadiene rubber is 10,000 g/mol to 700,000 g/mol.

8. The conductive material dispersion according to claim 1, wherein the hydrogenated nitrile butadiene rubber is comprised in the dispersant in an amount of 15 wt % to 50 wt %.

9. The conductive material dispersion according to claim 1, wherein a weight ratio of the polyvinyl butyral to the hydrogenated nitrile butadiene rubber is 5:5 to 9.8:0.2.

10. The conductive material dispersion according to claim 1, wherein, in Formula 1, A comprises a pyrene group, a chrysene group, a perylene group or a phthalocyanine group.

11. The conductive material dispersion according to claim 1, wherein R comprises an anionic functional group, and the anionic functional group is at least one selected from the group consisting of $-SO_3^-$, $-COO^-$, and $-PO_4^-$.

12. The conductive material dispersion according to claim 1, wherein the compound of Formula 1 is at least one selected from the group consisting of a compound of the following Formula 1-1 and a compound of the following Formula 1-2:

[Formula 1-1]

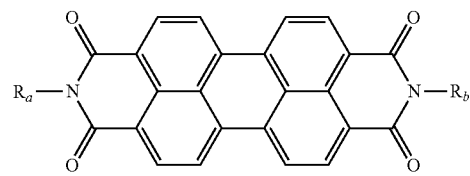

-continued

[Formula 1-2]

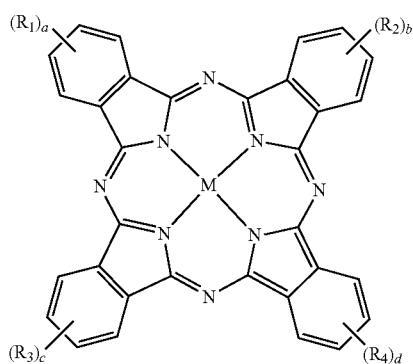

wherein in Formula 1-1, $R_a$ and $R_b$ are each independently a structure comprising an anionic functional group, and wherein in Formula 1-2, M is at least one selected from the group consisting of copper, aluminum, and zinc, $R_1$, $R_2$, $R_3$ and $R_4$ are each independently an anionic functional group, and a, b, c, and d are each independently integers of 0 to 4.

13. The conductive material dispersion according to claim 12, wherein the compound of Formula 1-1 comprises at least one of a compound of the following Formula 1-1A and a compound of the following Formula 1-1B:

[Formula 1-1A]

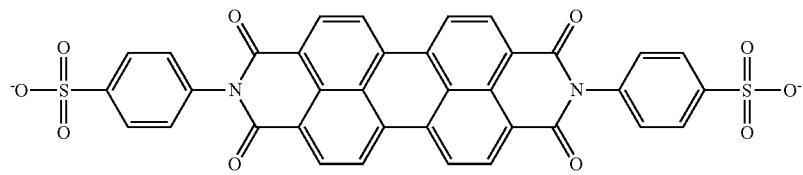

[Formula 1-1B]

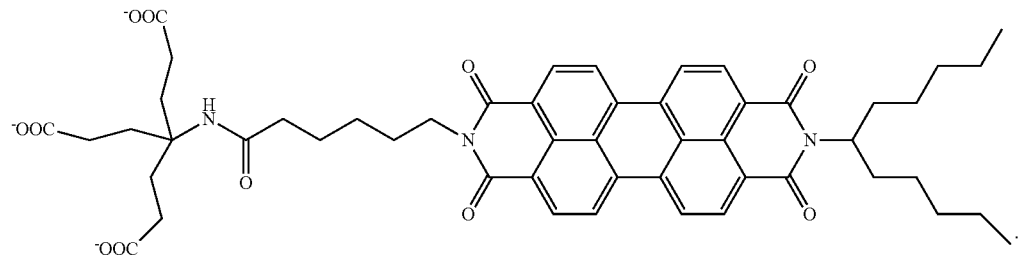

14. The conductive material dispersion according to claim 12, wherein the compound of Formula 1-2 comprises at least one of a compound of the following Formula 1-2A and a compound of the following Formula 1-2B:

[Formula 1-2A]

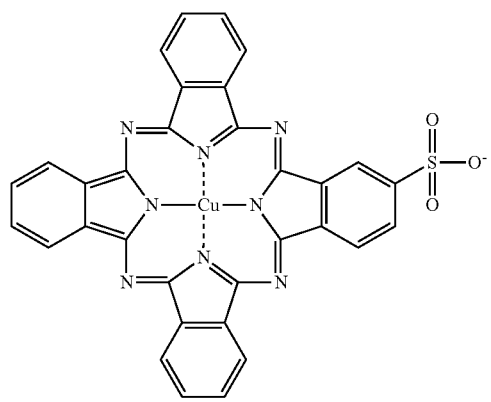

[Formula 1-2B]

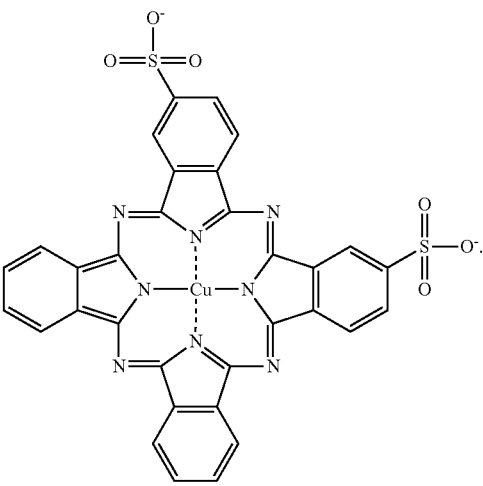

15. The conductive material dispersion according to claim 1, wherein the dispersion aid is comprised in an amount of 1 part by weight to 50 parts by weight based on 100 parts by weight of the single-walled carbon nanotubes.

16. The conductive material dispersion according to claim 1, wherein a weight ratio of the dispersant to the dispersion aid is 1:0.03 to 1:0.18.

17. The conductive material dispersion according to claim 1, wherein a weight ratio of the dispersant to the dispersion aid is 1:0.045 to 1:0.150.

* * * * *